UNITED STATES PATENT OFFICE.

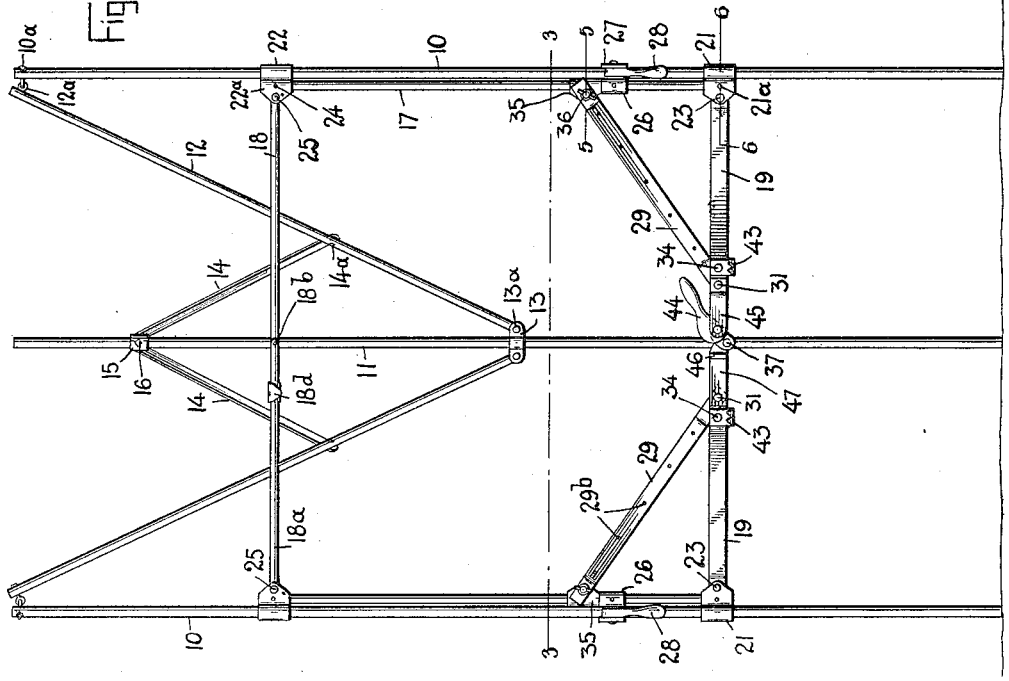

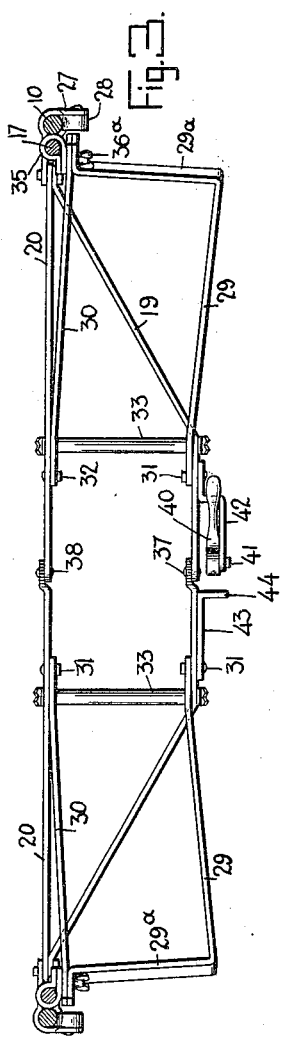

PARLEE CLYDE GROSE, OF BLANCHARD TOWNSHIP, HANCOCK COUNTY, OHIO.

FOLDING HOPPER AND SUPPORTING-FRAME THEREFOR.

1,069,415.  Specification of Letters Patent.  Patented Aug. 5, 1913.

Application filed February 6, 1913. Serial No. 746,558.

*To all whom it may concern:*

Be it known that I, PARLEE C. GROSE, a citizen of the United States, and a resident of Blanchard township, McComb P. O., in the county of Hancock and State of Ohio, have invented a new and Improved Folding Hopper and Supporting-Frame Therefor, of which the following is a full, clear, and exact description.

My invention has particularly for its design the production of a hopper that will have special usefulness on the farm. The uses to which the hopper may be put on the farm are many, perhaps the chief of which is in the corn-growing regions, where more or less husking is performed in the open field, with a husking pin or the like. It is customary for the husker to stand at a pile of fodder and to throw the husked ears several feet away to a pile, with the result that considerable corn is shelled, particularly in years when the kernels loosen easily; thus a considerable quantity of corn leaves the ears and is lost, being left on the field when the ears are picked up. Also when thrown upon the pile, as referred to, the ears are scattered more or less, and after the entire shock is husked considerable time is lost in gathering the distant ears and placing them upon the pile.

An object of my invention is to provide a hopper, and supporting frame therefor, readily portable and of light construction, and by the use of which, when the hopper is placed near the pile of stalks and lowered to a short distance above the ground, both the shelling of the kernels and the scattering of the ears will be reduced to a minimum, thereby preventing a very material loss of corn and time. Again; by the use of my improved hopper and frame, and employing a few ordinary grain bags, or one large one specially made, the corn may be bagged as it is husked. When hauling the husked corn from the field to the crib, the bags can be emptied directly into the wagon, or placed in a wagon and emptied directly into the crib; thus the time required to gather the corn of each pile in baskets or other receptacles before emptying into the wagon may be saved, as well as a reduction made in the time of unloading at the crib. Furthermore, in early spring or late fall, especially when the surface of the ground is liable to freeze slightly during the night and then thaw out and make the ground sticky and muddy during the day, the bags thus utilized will keep the ears clean, which otherwise is often impossible. Furthermore, by thus making it convenient to collect the corn in bags, husking may proceed even in threatening weather, since even although the filled and tied bags be covered with snow, they can be hauled the next day with the corn but little affected. The construction of the hopper also makes it available for use when husking in the barn, or under cover, so that the hopper will direct the corn into baskets or other receptacles to be dumped into the crib. Time is also saved, since the hopper makes it unnecessary for the husker to exercise so much care in throwing the ears to one point. The hopper is capable also of use in filling bags with small grain.

The distinguishing features of my invention, and the important structural elements characterizing the preferred embodiment which is illustrated as an example will be more particularly explained in the specific description hereinafter to be given.

Reference is to be had to the accompanying drawings forming a part of this specification, in which similar characters of reference indicate corresponding parts in all the views.

Figure 1 is a perspective view of a hopper and supporting frame therefor, embodying my invention, and including also a supported bag to which the hopper delivers; Fig. 2 is a front view of the frame in erect form; Fig. 3 is a horizontal section on a plane corresponding with the line 3—3 of Fig. 2; Fig. 4 is a detail side elevation of portions of the frame; Fig. 5 is a detail, in horizontal section, on the line 5—5 of Fig. 2; Fig. 6 is a similar section on the line 6—6 of Fig. 2; and Fig. 7 is a fragmentary perspective view showing a detail, and to be hereinafter referred to.

In constructing a practical embodiment of my invention, the frame comprises supporting elements and hopper-carrying elements, the latter being slidable on the supporting elements. The standards 10 of the supporting frame and other frame elements hereinafter mentioned may be of any desired cross sectional form. In addition to the standards 10, which are adapted to rest on the ground and constitute side members, an intermediate supporting leg 11 is provided, and connected with the standards 10 by spreader arms 12, which have a loose connection with the said standards, at the upper ends of the latter, by any suitable means, preferably by interlocked eye-bolts $10^a$, $12^a$. The spreader arms 12 are pivotally connected as at $13^a$, with a runner 13 having free sliding movement on the intermediate leg 11. Braces 14 are pivotally connected as at $14^a$ with the spreader arms 12, at points between the ends of the latter, the upper ends of the braces 14 being pivotally connected with a collar 15, also sliding on the leg 11 and adapted to be secured by a set screw 16 or its equivalent.

The vertically adjustable frame for carrying the hopper is arranged to have guided sliding movement on the standards 10, said sliding frame comprising side members 17 arranged alongside of and parallel with the said standards, an upper cross bar composed of sections 18, $18^a$ pivoted to each other and to the side bars 17, as hereinafter described, and front and rear bottom cross bars, the front cross bar being composed of sections 19 and the rear cross bar being composed of sections 20, said sections being pivotally connected with each other and with the side bars 17. Collars 21 are secured, as at $21^a$, to the lower end of each side bar 17, and embrace the standards 10, and similar collars 22 are secured as at 24, to the upper ends of the side bars 17 and also embrace the standards 10, the collars serving to give a sliding guided movement to the adjustable frame. The upper cross bar sections 18, $18^a$, are pivotally connected at their outer ends with the collars 22, as at $25^a$, the said collars being in the form of straps which are continued inwardly in the form of flanges $22^a$, through which the fastening rivets or their equivalent, 24, as well as the pivots 25 are secured. The lower collars 21 are similarly formed, and are pivoted as at 23 to the ends of the bottom cross bar sections 19, 20.

To secure the sliding frame on the standards in a given position, a suitable clamping means is provided; I have shown collars 26, which are rigidly secured to the side bars 17 of the sliding frame and embrace the standards 10, being continued forwardly, as at 27, and having fulcrumed thereon clamp levers 28 adapted to bind on the standards.

Braces are provided on the sliding frame at the bottom and serve also as a means to secure the hopper elements. Thus there are front braces 29 and rear braces 30, pivotally connected at their lower ends as at 31, 32, to the front cross bar sections 19 and rear cross bar sections 20 of the bottom frame, said braces inclining upwardly and outwardly to a pivotal connection with the side bars 17 of the sliding frame. The connection with the side bars 17 is established by collars 35, having sliding movement on said side bars, and bolts $36^a$ having thumb nuts 36, said bolts passing through the upper ends of the braces 29, 30, and through flanges or continued ends $35^a$ on the collars 35, said collars in the illustrated construction being in the form of straps bent around the bars 17. The front cross bar sections 19 are pivotally connected with each other, as at 37, and the rear cross bar sections 20 are pivotally connected with each other as at 38. Between a front cross bar section 19 and a rear cross bar section 20 are spacing sleeves 33 through which bolts 34 pass.

To constitute the hopper, a sheet 39 of canvas is secured in the sliding frame, the upper end of the canvas being secured detachably by suitable means, such as cords 40. At the lower end the canvas sheet 39 is suitably attached to the rear cross brace members 30, by tying or otherwise, and to the front inclined brace 29 a substantially triangular piece 41 of canvas is pivotally secured as by cords $41^a$, to constitute the front of the hopper. The said front braces, it will be observed, are of angular form, being offset at the upper ends as at $29^a$ from the rear brace members 30, and between said front and rear braces a hopper bottom is secured and may consist of sections 42 of canvas, metal, or other suitable material. The bottom sections 42 extend from the upper offset ends $29^a$ of the braces downwardly and inwardly, the lower ends of the bottom sections being spaced apart any suitable distance to provide an outlet opening for the hopper.

On the bottom cross bar sections 19, 20 of the sliding hopper frame I provide means for holding a bag A; preferably said means consists of hooks 43 secured by the bolts 34, or their equivalent. In connection with the bag-holding hooks 43, additional means for gripping the bag is provided, consisting of a cam lever 44 pivoted on an arm 45 of one front cross bar section 19, adjacent to the meeting ends of said cross bar sections. The lever 44 coacts with the forwardly extending arm 46 which may be formed on a bracket 47. With the mouth of the bag engaged with the hooks 43, as shown in Fig. 1, the loose intermediate portions of the bag at the front are gathered and brought between the arm 46 and the cam lever 44, so that upon rocking said lever the entered portions of the bag will be tightly gripped. To secure the canvas front $41^a$, the brace members 29 have suitable holes $29^b$ (Fig. 2). Similar holes are formed in the brace members 30 for receiving an attaching cord or thread for the large canvas 39.

With the frame erect and provided with the hopper as shown in Fig. 1, it will be obvious that in husking corn the device may be placed near the pile of stalks and the husked ears thrown by the husker against the canvas sheet 39 which forms a broad stop surface, so that there will be little excuse for the husker not throwing the ear against the canvas. As the leg 11 and the members 12 and 14 sit rearwardly on an incline from the canvas, the throwing of the ear will not result in shelling the corn. The successive ears fall from the sheet 39 and drop to the bottom sections 42 of the hopper, to escape therebetween. When a bag A is not employed, the hopper-carrying frame is lowered by manipulating the levers 28, so that the hopper bottom will be sufficiently close to the ground to prevent the corn from being shelled as the ears drop to the accumulating pile. If the bag A be employed the ears will drop directly thereinto.

By the tightening of the thumb nuts 36 on the bolts $36^a$ when the frame is erect with the levers 28 securely clamping the sliding frame in position, the structure will be held rigid and against collapsing; when it is desired to collapse the frame with or without the hopper, the thumb nuts 36 are loosened and the bottom frame caused to break upward on the pivots 37, 38. The top cross bar formed of the sections 18, $18^a$ is then also caused to break upward, and the set screw 16 of the collar 15 is loosened, whereby the structure can be collapsed by simply bringing the standards 10 together, the leg 11 folding into approximate parallelism with the standards 10, owing to the loose hinge connection $10^a$, $12^a$. To permit the sections 18, $18^a$, to break upwardly and fold, they may be pivoted as at $18^b$, by a horizontal pin, and one section extends beyond the pivot as at $18^c$, and terminates in a laterally curved arm $18^d$, to bear upon the opposite section when the sections are in alinement, in the erect position of the frame.

The described construction affords a practical means for carrying my invention into effect, and I would state in conclusion that I do not limit myself strictly to the mechanical details herein illustrated, since manifestly the same can be considerably varied without departing from the spirit of the invention.

Having thus described my invention, I claim as new, and desire to secure by Letters Patent:

1. A folding hopper and folding support therefor, comprising a collapsible frame, and a hopper carried by the frame, the said hopper having a flexible back and front and a bottom having an outlet, the front and back being adapted to collapse in response to the collapsing of the frame and the back rising above the front and constituting a stop for material directed against the same.

2. A folding hopper-support, comprising a main collapsible frame, having side members, and members uniting said side and pivotally connected therewith, and an auxiliary frame having vertical sliding support on the main frame and constituting a hopper-support, said auxiliary frame being formed of collapsible members and both frames being collapsible in unison.

3. A folding support for a hopper of the character described, comprising a main frame formed of collapsible members, and an auxiliary collapsible frame formed of foldable members and having guided movement on the main frame, the two frames being collapsible in unison, and the auxiliary frame having foldable hopper-carrying members.

4. A folding hopper and folding support therefor, comprising a collapsible support, a flexible sheet on said support forming the back of the hopper, a hopper front at the lower end of the flexible sheet, and spaced forwardly therefrom, a hopper bottom, and collapsible elements on said support at the lower end of said sheet, and forming frame members for the said hopper front, hopper bottom, and for the lower end of the sheet forming the back.

5. A hopper and a support therefor, comprising a frame, and a hopper having a bottom, a front, and a back, the back being in the form of a flexible sheet spread on said frame and held thereto and rising a material distance above the front of the hopper.

6. The herein-described hopper-support, comprising spaced side members foldable toward and from each other, folding cross bars uniting said members, a pivoted leg at the back of said support, and folding members connecting the leg with the side members, said support having means for securing a hopper thereon.

7. The herein-described hopper-support, comprising side standards foldable toward and from each other, folding transverse members uniting said standards, a vertically-adjustable, collapsible frame on the standards, and a collapsible hopper carried by said adjustable frame.

8. The herein-described collapsible support for a hopper, comprising side members, cross bars composed of articulated members uniting the side members, a leg, and spreader members movably connected with the side members and leg to collapse with the side members and articulated cross bars.

9. The herein-described collapsible support for a hopper, comprising side members, cross bars composed of articulated members uniting the side members, a leg, spreader arms movably connected with the side members and leg respectively to collapse with the side members and cross bars, and braces pivotally connected at the ends with the leg and spreader arms, one end connection of said braces being slidable.

10. The herein-described collapsible support for a hopper, comprising spaced standards, cross bars composed of articulated members uniting the standards, a leg at the back of the standards, spreader arms connected at their upper ends with the upper ends of the standards to swing forward and back and toward and from the standards, the said spreader arms converging toward their lower ends, a runner sliding on the leg and pivotally connected with the lower ends of the spreader arms, a sliding collar on the leg above the runner, means for fastening the collar in a fixed position, and braces pivoted to the said collar at their upper ends and diverging downwardly, the lower ends of the braces being pivoted to the spreader arms, between the ends of the latter.

11. The herein-described support for hoppers, comprising an open collapsible frame, means to support a hopper bottom, a hopper back and a hopper front thereon, a leg at the back of said frame, and spreader arms connected at their lower ends with the frame, at the sides, to swing forward and back and toward and from said sides, and pivotally and slidably connected with the said leg.

12. The herein-described support, comprising a collapsible main frame, a collapsible auxiliary frame adjustably mounted on the main frame and having means for securing a hopper back thereto, and means to hold a hopper front and a hopper bottom, said last mentioned means including articulated cross bars and spaced front and rear brace members pivotally connected with said articulated cross bars, and slidably connected with the auxiliary frame, at the side of the latter, the braces having means to hold them against movement relatively to the sides of the auxiliary frame.

13. The herein described support, comprising standards and an auxiliary frame sliding on said standards, the auxiliary frame comprising side members, an articulated upper cross bar uniting the side members, front and rear bottom cross bars uniting the side members and each composed of articulated members, and front and rear spaced brace members connected with each side member of the auxiliary frame and connected with the respective members of the front and rear articulated bottom cross bar, the means for connecting the braces with the side members of the auxiliary frame consisting of collars slidable on the said side members, bolts pivotally connecting the braces with the collars, and nuts on said bolts adapted to hold the braces against movement to prevent the collapsing of the support.

14. A collapsible support for a hopper, comprising side members and upper and lower cross bars articulated to collapse, and elements associated with the lower cross bar members, said elements constituting braces between the lower cross bar member and the side members, and having means for holding hopper members.

15. A collapsible support for a hopper, comprising a folding frame having side members and collapsible connecting members and adapted to receive a hopper bottom having an outlet and a hopper front at the lower end, and means located above the front for holding a hopper back on said support, the side members being collapsible toward each other and the connecting members having pivotal movement relatively to the side members and collapsible therewith.

In testimony whereof I have signed my name to this specification in the presence of two subscribing witnesses.

PARLEE CLYDE GROSE.

Witnesses:
J. FRANK HICKERSON,
WILLIAM KOONTZ.

---

Copies of this patent may be obtained for five cents each, by addressing the "Commissioner of Patents, Washington, D. C."